United States Patent Office 3,279,604
Patented Oct. 18, 1966

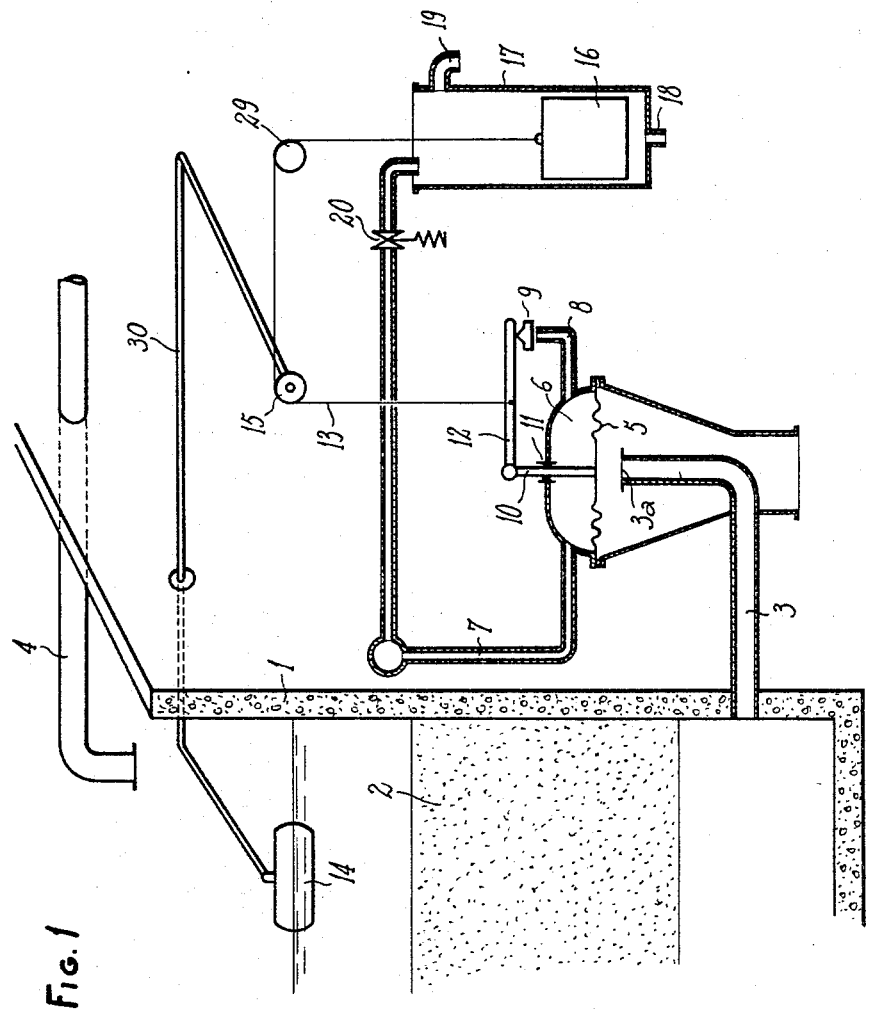

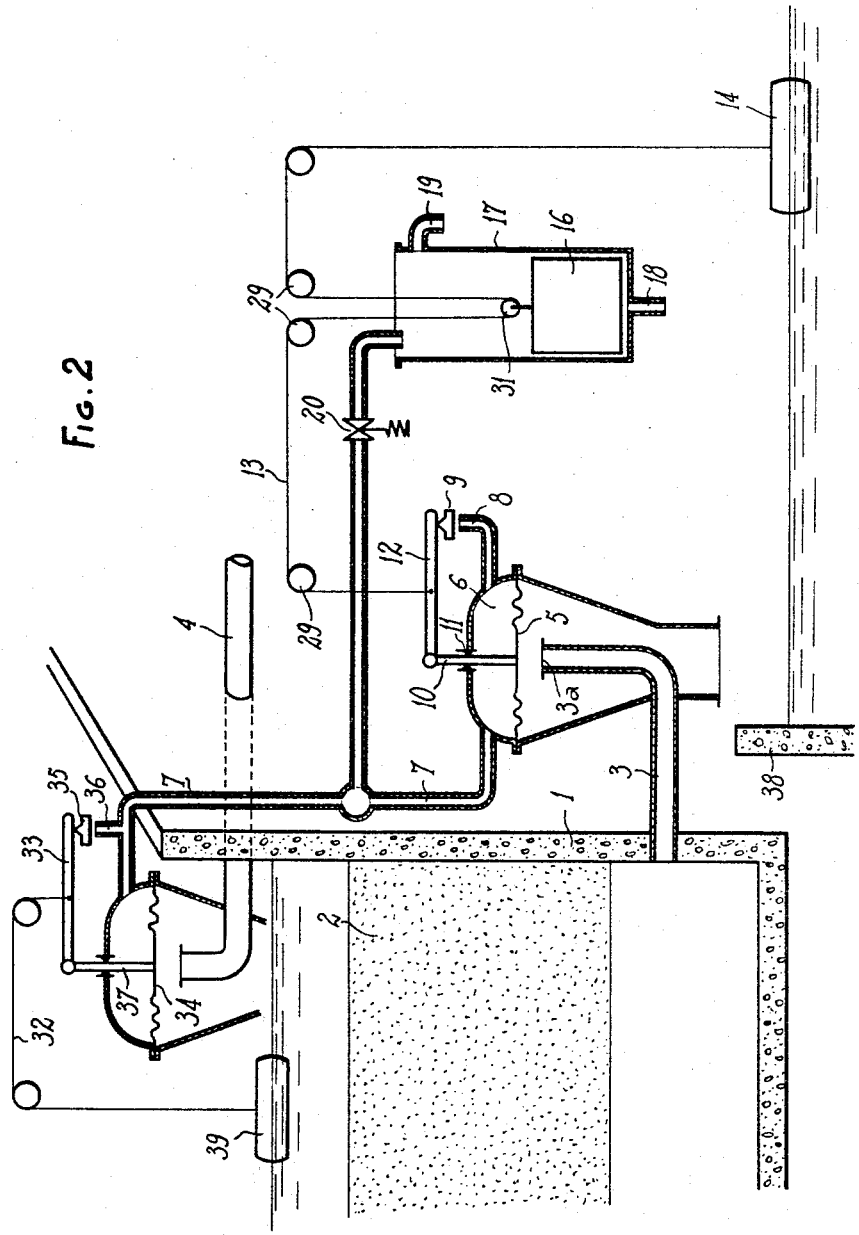

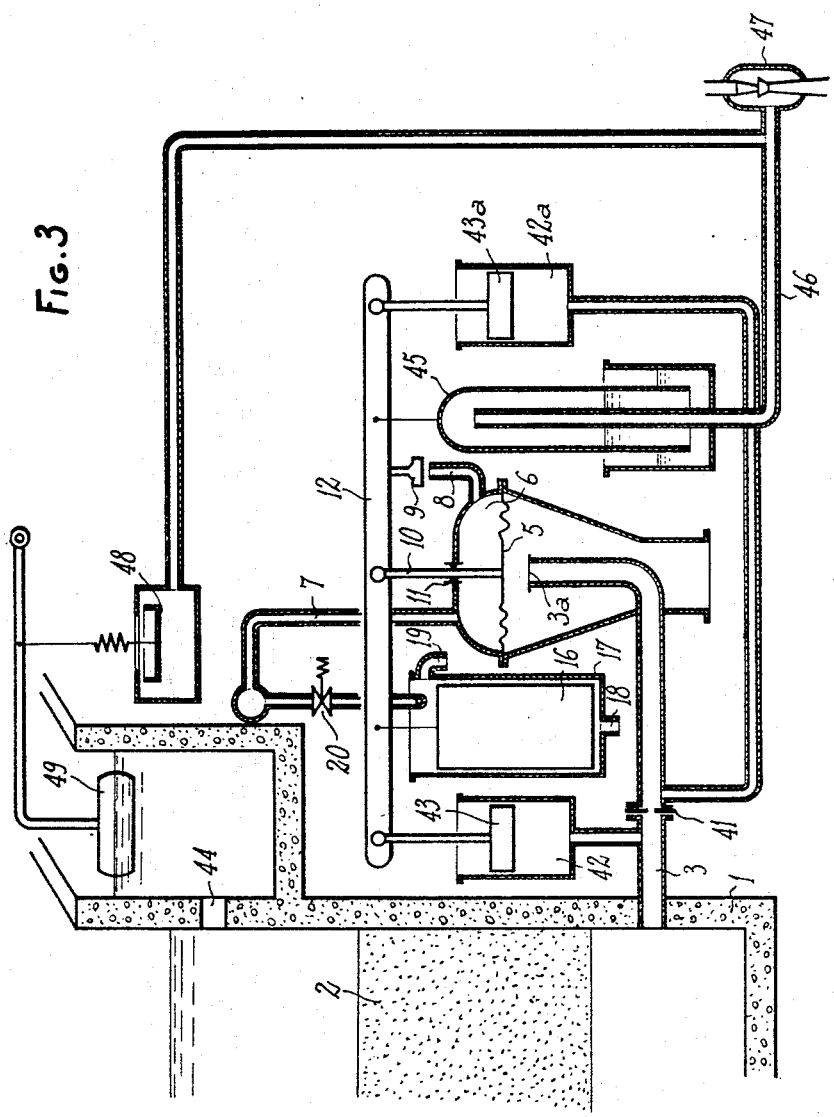

3,279,604
LIQUID FLOW REGULATING ARRANGEMENTS
Roger Léon Leviel, Courbevoie, France, assignor to Degremont, Rueil-Malmaison, France, a society of the French republic
Filed Apr. 30, 1964, Ser. No. 363,878
Claims priority, application France, May 9, 1963, 934,235, Patent 1,364,119
9 Claims. (Cl. 210—101)

This invention relates to liquid flow regulating arrangements of a type that are especially useful in connection with hydraulic systems such as water filtering installations and the like for regulating the discharge rate of filtered water in response to an operating parameter, such as the rate of supply of unfiltered water to the filter tank, the level of filtered water in a storage reservoir supplied from the filter tank, and/or other related factors.

In water filtering plants it is important to regulate the rate of discharge of filtered water from the filter tank or tanks so as to maintain said rate at a prescribed value despite variations in the rate of supply of unfiltered water to the filter tank, and/or variations in the rate at which filtered water is drawn off from a storage reservoir supplied therefrom.

In a known type of regulator arrangement widely used for this and related purposes, the discharge pipe has associated with it a pressure-responsive obturator member (e.g. flexible diaphragm), variably positionable in relation to the outlet of the discharge pipe to control the rate of discharge therefrom and an auxiliary pressure-fluid circuit connected with the obturator member to vary the position thereof in accordance with the pressure of the fluid in said circuit. The circuit includes a valve operable to modify the fluid pressure acting on the obturator member, the valve being connected for operation in response to means sensing the prescribed operating parameter, e.g., a float sensing the level of water in the filter tank or the storage reservoir. Further, a follow-up connection is provided from the obturator member to reposition the valve and avoid hunting.

Conventional regulator systems of this type are not entirely satisfactory.

In a filtering installation, it is important to avoid sudden and large variations in discharge flow rate since rapid increases in discharge rate may tend to dislodge impurities from the filter bed, and allow them to be carried out with the effluent water. Thus, after a filter unit has been shut down for a period of time, it is undesirable when starting up the unit again for further operation, that the full flow capacity should be reapplied immediately. Conventional regulator systems of the type outlined above have no provision for conveniently increasing the discharge flow rate from the filter unit in a controlled and gradual manner from zero or a minimum value, to its full or normal value, and it is an important object of the present invention to overcome this shortcoming of conventional flow regulating arrangements.

For example, in conventional regulating systems the obturator member is sometimes controlled in response to the flow rate through the discharge pipe as sensed by a differential-pressure flow-senser means of the Venturi type or the like. The obturator member is moved to open position when the pressure drop through the flow senser is low and is moved to sealing position when said pressure drop is high. When the filter unit is shut down, the pressure drop across the flow senser is zero since there is no discharge. When the filtered-water discharge valve is thereafter reopened to resume system operation, the obturator member is in a wide-open position and the discharge rate initially is very large, greater even than during normal filter operation, until such time as the regulator device has had the opportunity to respond and move the obturator member to a partly closed position providing the prescribed discharge flow rate.

It is an object of this invention to provide an improved regulating arrangement for water filtering plant and other hydraulic installations, wherein closer control can be exerted on the discharge rate of liquid from a tank so as to bring said rate gradually from a zero or minimal flow rate, as during shutdown of the system, to its full value and thereafter ensure effective regulation of said flow rate in response to a selected operating parameter.

According to an aspect of the invention, there is provided in a discharge flow regulator arrangement for a hydraulic system, means for disabling a control connection from the means sensing the selected operating parameter, to a valve controlling the pressure of fluid acting on a movable obturator, thereby to suspend the action of said parameter on the valve and maintain the obturator in a prescribed generally closed position, including means for progressively re-establishing said control connection to reintroduce said controlling action in a gradual manner.

Further objects include the provision of improved hydraulic flow regulator means which will be efficient and practical to operate and yet simple to manufacture and service. Other objects, aspects and features of the invention will appear.

Exemplary embodiments of the invention will now be described for purposes of illustration but not of limitation with reference to the accompanying diagrammatic drawings, in which:

FIG. 1 illustrates a first embodiment of improved flow regulating means as applied to a water filtering system in which the discharge rate is regulated in proportion to the water level in the filter tank (so-called "upstream regulation");

FIG. 2 shows another embodiment in which the discharge rate is regulated in proportion of the level in a filtered-water storage reservoir (so-called "downstream regulation"); and FIG. 3 illustrates a third embodiment in which the discharge rate is regulated in proportion to the water level in a supply canal or the like supplying unfiltered water to each of a set of filter units in a filtering station.

In the embodiment illustrated in FIG. 1, there is provided a filter tank 1 partly shown, and containing a filter bed 2 therein, such as sand or other suitable filtering material. Feed water to be filtered is delivered into the tank from an overhead conduit 4. Filtered water is discharged from the bottom of the tank 1 below the filter bed 2 by way of a discharge conduit 3. As shown, the discharge conduit 3 is bent vertically upwards at its outer end and the vertical end portion is surrounded by an upwardly flared regulator casing 5a, provided with a cover defining a regulator chamber or capacity 6. Between the casing 5a and its cover is attached an obturator diaphragm 5 which overlies the outlet end 3a of the discharge pipe 3 in variably spaced relation with it and defines a deformable bottom wall for capacity 6.

Auxiliary fluid under pressure, e.g. water, from a suitable source is at all times during operation delivered into the regulator capacity 6 by way of an inlet line 7, and is discharged from the capacity through an outlet 8. The outlet 8 can be sealed by means of a valve member 9 carried at the end of a lever arm 12. Pivoted to the opposite end of lever arm 12 is a vertical rod 10 which extends downward into capacity 6 by way of a sliding seal 11 provided through the cover thereof, the lower end of rod 10 being secured to the central area of diaphragm 5.

Attached to an intermediate point of lever arm 12 is the lower end of a cable or rope 13 which passes around a movable pulley 15 and a stationary pulley 29 and has a control float 16 attached to its free end. The float 16 is a relatively large and heavy float having an overall specific gravity slightly less than unity, and is positioned within a small control tank 17 which is adapted to be filled with water by means of an upper inlet as shown, provided with a flow regulating valve 20 which may be manually or automatically controlled. The control tank 17 is provided with a bottom leakage outlet 18, which may be adjustable if desired, and with an overflow discharge 19.

The movable pulley 15 is mounted at one end of an arm projecting at right angles from a shaft 30 mounted for rotation about a horizontal axis as schematically shown, extending through the wall of the filter tank 1. Within this tank the shaft 30 has another arm projecting at right angles from it and carrying at its end a main float 14 resting at the surface of the body of water in tank 1. Thus the float 14 follows the variations in the water level in tank 1 which is to be regulated.

The system thus described operates as follows. Normally the control tank 17 is initially empty and the heavyweight float 16 rests on the bottom of the tank. Assuming the water level within the filter tank 1 tends to rise due e.g. to an increase in the supply flow rate from pipe 4, the float 14 rises, and through linkage 30 correspondingly raises the pulley 15. Since the right-hand extremity of the cable 13 connected to the heavyweight float 16 serves as a fixed point, upward movement of pulley 15 raises through cable 13 the lever arm 12 rotating it counterclockwise about its left-hand pivot, and unseats the valve member 9 from its seat on the outlet of pipe 8. The resulting discharge of pressure from out of the regulator chamber 6 causes upward movement of the obturator diaphragm 5, which thus moves away from the outlet end 3a of discharge pipe 3 and permits an increase in the discharge rate of filtered water from out of the filter tank through pipe 3.

The upward movement of rod 10 at the same time produces a slight clockwise rotation of lever arm 12 about the point of attachment of cable 13 as a fulcrum, thereby causing closure of the valve 9, in a follow-up action. The pressure water continually entering the regulator chamber 6 through pipe 7 promptly causes the pressure in the chamber to build up again over the diaphragm 5 which thus assumes a new position of equilibrium in which the rate of discharge of regulator fluid past valve 9 equals the rate of delivery of said fluid through inlet pipe 7. It will thus be understood that to each position of the float 14 in the filter tank there corresponds a well-determined position of the diaphragm 5.

When it is desired to arrest the discharge of filtered water from tank 1 through outlet pipe 3, the small control valve 20 is opened manually or automatically. Water flows into the control tank 17 to a level determined by the overflow weir 19. The control float 16 rises correspondingly in tank 17, so that the cable 13 is displaced longitudinally over pulleys 29 and 15, the latter pulley remaining stationary, and the lever arm 12 rotates in the direction to close valve 9 completely. The pressure in chamber 6 now builds up to a high value, applying the obturator diaphragm 5 downward against the upper end 3a of pipe 3, and cutting off the discharge of filtered water. In this condition of the regulator, complete closure is obtained regardless of the position of main float 14 in the filter tank, since the cable 13 is in a completely slack condition, and the controlling action of main float 14 on the valve 9 is suspended.

The filter bed may then be flushed in the conventional manner by a backflow of water through it and a blast of air. This operation may result in a slight rise of the water level in the filter tank, without objectionable effect on the regulator. After the filter-cleaning operation has been completed, the water level in the filter tank may accordingly be somewhat higher than the prescribed regulated level, but the regulator will still remain closed so long as the control tank 17 remains full and the cable 13 consequently slack. When it is desired to place the filter system back into service in a gradual manner the valve 20 is closed. The control tank 17 now drains off gradually through its restricted bottom outlet 18, the control float 16 drops, and eventually the cable 13 is again brought to a taut condition, causing a slight opening of the valve 9. Some water is thus allowed to drain out of the regulator chamber 6, lifting the diaphragm 5 and allowing discharge of water from the filter tank through outlet 3. The water level above the filter bed in tank 1 now falls, and it will be noted that the rate at which the water level falls off in tank 1 is substantiallly equal to the rate ta which the control float 16 drops in control tank 17. It will thus also be understood that if the effective flow section of the restricted outlet 18 is made adjustable, the time period over which the gradual reactivation of the filter system is made to proceed can be adjusted, and rendered as long as may be desired. In practice, activation periods in the range of about from 10 to 30 minutes are conveniently used.

In the embodiment of FIG. 1 just described, the regulating arrangement of the invention serves to regulate the rate of discharge of filtered water so as to maintain the water level in the filter tank 1 constant regardless of variations in the rate of supply of unfiltered water into the tank, and in such a manner that said rate of discharge will at all times remain equal to the rate of supply. This type of regulation may be termed "upstream regulation."

In the embodiment now to be described with reference to FIG. 2, a regulator arrangement according to the invention acts to regulate the rate of discharge of filtered water so as to hold the water level in a filtered-water storage reservoir constant regardless of the amount of water tapped from said storage reservoir, and in such a manner that the rate of discharge of filtered water from the filter tank will at all times remain equal to the rate of filtered water consumption from the storage reservoir. This may be termed "downstream regulation." It will be understood that in this case, a second and generally similar regulator device would normally be arranged over the filter in order to control the rate of supply of unfiltered water thereto so as to maintain the water level in the filter tank constant.

In FIG. 2, parts corresponding in function to parts present in FIG. 1 are similarly designated and will not be described anew. The filter tank is shown at 1 and it will be noted that the inlet pipe 4 for unfiltered water has associated with its outlet a regulator device later described in detail. The filtered-water storage tank is shown at 38 and underlies the filtered-water outlet 3 of tank 1 so as to be supplied with filtered water therefrom at a rate determined by the action of the regulator associated with outlet pipe 3. The controlling factor in this embodiment is the level of the body of filtered water in tank 38, as sensed by the main float 14 therein.

In this case the cable 13 attached to the valve lever arm 12 is passed over fixed pulleys and has its free end attached to the float 14. A bight or loop formed in an intermediate portion of cable 13 is passed around a pulley 31 which is attached to the top of heavyweight float 16 in control tank 17.

In the operation of this embodiment, so long as the control tank 17 is empty so that the float 16 rests on the bottom of this tank, the up and down movements of main control float 14 are transmitted unchanged through cable 13 to lever arm 12, so that with each position of main float 14 there corresponds a well-defined position of the obturator diaphragm 5. When the level in filtered-water storage reservoir 38 falls the obturator diaphragm 5 rises, increasing the rate of delivery of filtered water from outlet 3a into the reservoir 38, and when the level in reservoir 38 rises, the diaphragm 5 moves downward to reduce the rate of supply of filtered water to the reservoir.

When it is desired to cut off delivery of filtered water into reservoir 38 and arrest the action of the regulator, the valve 20 is opened to fill water into the control tank 17. The float 16 rises and through cable 13 permits lever arm 12 to close the valve 9, thereby completely cutting off the discharge through pipe 3 and terminating the operation of the regulator as described for the first embodiment. If the filter apparatus is then cleaned while filtered water still continues to be tapped from the storage reservoir 38, the level in this reservoir falls, and float 14 moves downward but this does not reactivate the regulator since the cable 13 is completely slack.

When it is desired to reactivate the filter system and the regulator action, valve 20 is closed. The water drains gradually out of the control tank 17, float 16 drops gradually, resulting in a gradual opening of the valve 9. Diaphragm 5 rises accordingly, at a slow rate, and filtered water is allowed to discharge from outlet 3 into the storage reservoir 38, first at a slow rate then increasingly faster. The upward movement of diaphragm 5 and the discharge of filtered water proceed so long as the downward movement of float 16 continues, until this float is again resting on the bottom of tank 17 at which time the normal level has been restored in the reservoir 38. Normal operation of the regulator is then resumed to maintain the prescribed level in reservoir 38 as above described.

The "downstream" mode of regulation used in this embodiment requires that the rate of supply of unfiltered water through inlet pipe 4 into filter tank 1 shall at all times be equal to the rate of discharge of filtered water through pipe 3. To ensure this, as earlier indicated, an additional regulator is associated with the inlet pipe 4 and as shown this inlet regulator has no gradual-reactivation means associated with it.

As shown in FIG. 2, the inlet regulator includes a diaphragm 34 the movements of which are transmitted by way of a follow-up rod 37 to the lever arm 33 carrying the valve 35 controlling the rate of outflow through leakage orifice 36, which branches off from the line 7 delivering water under pressure into the regulator chamber above diaphragm 34. An intermediate point of lever arm 33 has attached to it a cable 32 which is trained about a pair of stationary pulleys and to the opposite end of which is attached the float 39 sensing the level of water in the filtering tank 1. The operation of this inlet regulator device to control the supply rate of unfiltered water through pipe 4 into the filter tank 1 so as to maintain the water level in the tank constant will be evident from the explanations earlier given, and need not be described in detail.

FIG. 3 presents an embodiment of the invention in which the rate of delivery of filtered water from a filter tank, such as one of a set or battery of filter units provided at a filtering station, is regulated in response to a remote controlling factor which may be, for example, the water level in a common feeder canal or culvert supplying unfiltered water to the various units of the station. Components similar to those found in the first two embodiments are similarly designated and will not be described in detail.

In this instance the filter water discharge pipe 3 has an orificed diaphragm 41 (or a Venturi throat) provided in it at a point spaced between the connection of the pipe 3 with the filter tank 1 and the discharge end 3a of the pipe. Branch lines connected with pipe 3 ahead of and beyond the orifice 41 communicate with the bottoms of respective open-topped cylindrical tanks 42 and 42a, in which pistons 43 and 43a are vertically slidable respectively. The pistons are attached to the lower ends of rods the upper ends of which are pivoted to the respective ends of the dual valve-control lever 12, the midpoint of which has the follow-up rod 10 pivoted to it, this rod having its lower end secured to the centre of the regulator diaphragm 5 as in the preceding embodiments.

Suspended from a point of dual lever 12 situated between its centre fulcrum and piston 43, is a heavy float or weight 16 positioned in the control tank 17. Suspended from a point of dual lever 12 situated between its centre fulcrum and piston 43a is an inverted bell-jar or airbell 45 having its open lower end immersed in a body of liquid such as water or mercury. An air tube extending upward into the airspace in bell-jar 45 is connected by way of a line 46 with a source of suction, shown as an ejector 47. A branch line extending from line 46 connects with a valve chamber 48a, which has a top opening sealed by a spring-biased valve member 48. The valve member 48 is attached to an intermediate point of a pivoted lever arm to the free end of which is secured a float 49 sensing the water level in canal 44 which supplies unfiltered water to the filter tank 1, and simultaneously to other similar filter tanks of a common filtering station.

In the operation of this embodiment, the rate of discharge of filtered water through pipe 3 is sensed as a pressure drop created across the orifice 41 and transmitted to both cylinder tanks 42 and 42a, so that the pistons 43 and 43a cooperate to apply a torque to the lever 12 about its central pivot, in the direction, clockwise in the drawing, which tends to apply the valve head 9 against outlet 8. The weight of the float 16 normally balances this torque and determines the prescribed value for said rate of discharge. Thus, when the rate of flow through discharge pipe 3 exceeds the prescribed value, the pressure drop across orifice 41 increases, the clockwise torque applied to lever 12 overcomes the counterclockwise torque exerted by the weight 16, the lever 12 rotates to close the valve 9 and the pressure of fluid above diaphragm 5 builds up and acts downward on obturator diaphragm 5 to reduce the rate of discharge of filtered water from outlet pipe 3. If on the other hand the discharge rate through pipe 3 tends to drop below the prescribed value, the action of weight 16 predominates over that of the pistons 43, 43a, and the effect is reversed, so that the discharge rate through pipe 3 again returns to the prescribed value.

To cut off the discharge of filtered water and suspend the regulating action, water is filled into control tank 17 by opening the valve 20. When the mass 16 is immersed in water, its action on lever 12 is substantially cancelled, so that the lever 12 assumes a position in which it closes the valve 9 regardless of the rate of outflow of filtered water.

To reactivate the system, valve 20 is closed. Control tank 17 empties gradually, and as the weight 16 emerges from the emptying tank 17 it applies a progressively increasing torque on to the lever 12 in the counterclockwise direction tending to open valve 9. The pressure in the regulator chamber above diaphragm 5 gradually drops, the diaphragm 5 rises and the rate of discharge of filtered water from pipe 3 gradually increases until the resulting pressure differential across orifice 41 assumes a value such that the clockwise torque applied by the pistons 43–43a balances the weight of the non-immersed upper part of the float 16. Thus during the gradual draining of water out of the control tank 17 the rate of discharge of filtered water also increases at a very gradual rate proportional to the rate of discharge of water out of the control tank 17. This rate can be controlled as by providing a valve in the drain outlet 18.

The prescribed rate of discharge of filtered water from tank 1 as maintained constant by the regulator arrangement just described, may be varied so as to maintain the water level in supply canal 44 constant in the following manner. Normally the suction applied by suction device 47 through line 46 to the air space in belljar 45 is such that the torque applied by the belljar to lever 12 is substantially zero. Assuming the level in canal 44 changes, float 49 pivots its lever arm in one or the other direction to vary the degree of opening of the valve member 48.

The rate of entry of atmospheric air into valve case 48a and the suction line 46 is thus varied so that the amount of suction in the air chamber of belljar 45 changes. The belljar 45 now applies an additional torque to lever 12, which combines with the torques exerted by pistons 43–43a and float 16 to alter the setting of obturator diaphragm 5.

The rate of discharge of filtered water from filter tank 1 can thus be regulated so as to maintain the water level in the feeder canal constant. The canal 44 may serve to supply water to a battery of filter units of a filitering plant, and the arrangement described including float 49, vent valve 48, suction pump 47 and suction line 46 may be common to all of the filter units of the plant so as to regulate the discharge flow rate of each unit.

It will be seen that in all of the embodiments disclosed the device including the control tank 17 and auxiliary control float 16 ensures that the changes in flow rate due to the action of the regulator system occur in an extremely gradual manner especially when the system is started up, e.g. after a shutdown for cleaning or the like. With the invention, the flow rate following shutdown increases very gradually from zero and only resumes its full value at the end of a period of time, e.g. thirty minutes, which may be adjustable if desired. This reliably averts the danger of any impurities retained in the filter bed being dislodged and entrained by the rapid increase in water flow. The apparatus of the invention moreover involves few and simple parts, so that it is strong and reliable in operation and inexpensive to make and service.

It will be evident that various modifications may be introduced into the embodiments illustrated and described without exceeding the scope of the invention. Thus, certain features disclosed in connection with one of the embodiments may well be incorporated in another. The principal feature of the invention, while illustrated in the form of an hydraulic device including a float 16 positioned in a control tank 17 which is fillable with water, may well assume other forms, e.g. electromechanical, which will perform an equivalent function in modifying the effective length of the cable or other transmission means acting on the valve lever 12. Thus, there may be provided an electrical motor acting through a gear-and-rack mechanism to alter the effective length of the cable 13 (FIG. 1 or 2).

In the embodiment of FIG. 3, the cylinder-and-piston units 42–43, 42a–43a, may be replaced by flexible bellows of conventional construction. The belljar device 45 may also be replaced with a similar bellows unit, or other equivalent means capable of applying a controllable opposing torque to the valve lever 12. Various other modifications may be conceived by those familiar with the art.

What I claim is:

1. In an hydraulic system including a liquid tank, means supplying liquid into the tank, and a discharge pipe for liquid from the tank, a regulator system comprising a pressure-responsive obturator means variably positionable in relation to the discharge pipe to control the rate of flow therefrom, an auxiliary pressure-fluid circuit means connected with the obturator means and including a valve operable to modify the fluid pressure acting on the obturator means to vary the position thereof in relation to said discharge pipe, means sensing an operating parameter of said system, a control connection from said sensing means to said valve, a follow-up connection from said obturator means to said valve to reposition the valve on variation in the posiiton of the obturator means, means for disabling said control connection to suspend the action of said operating parameter on the valve and maintain the obturator means at a prescribed setting relative to said discharge pipe, including means for progressively re-establishing said control connection to reintroduce said controlling action in a gradual manner, said disabling and progressive re-establishing means comprising a control float member connected to said valve so as to tend to operate said valve in one direction under the force of gravity, a control tank containing said float member, means for filling liquid into the control tank to cancel the gravity of the float member and operate the valve in the opposite direction, means for gradually draining the liquid out of the control tank to re-establish the normal gravity of the float member in a progressive manner, and said pressure fluid being a liquid and constituting the liquid filled into the control tank.

2. In an hydraulic system including a liquid tank, means supplying liquid into the tank, and a discharge pipe for liquid from the tank, a regulator system comprising a pressure-responsive obturator means variably positionable in relation to the discharge pipe to control the rate of flow therefrom, an auxiliary pressure-fluid circiut means connected with the obturator means and including a valve operable to modify the fluid pressure acting on the obturator means to vary the position thereof in relation to said discharge pipe, means sensing an operating parameter of said system, a control connection from said sensing means to said valve, a follow-up connection from said obturator means to said valve to reposition the valve on variation in the position of the obturator means, means for disabling said control connection to suspend the action of said operating parameter on the valve and maintain the obturator means at a prescribed setting relative to said discharge pipe, including means for progressively re-establishing said control connection to reintroduce said controlling action in a gradual manner, said disabling and progressive re-establishing means comprising a control float member connected to said valve so as to tend to operate said valve in one direction under the force of gravity, a control tank containing said float member, means for filling liquid into the control tank to cancel the gravity of the float member and operate the valve in the opposite direction, means for gradually draining the liquid out of the control tank to re-establish the normal gravity of the float member in a progressive manner, a pivoted lever connected to operate said valve, linkage connected to said obturator means and to a point of said lever to provide said follow-up connection, a flexible element connecting the control float to a point of said lever to tend to operate said valve in said one direction, and means connecting the sensing means with said flexible element to operate said valve in one or the other direction in response to changes in said operating parameter when the control tank is drained of liquid and the control float is resting on the bottom of the tank by gravity.

3. The combination defined in claim 2, wherein said operating parameter constitutes a liquid level and said sensing means comprises a float, and said means connecting the sensing means with said flexible element comprises linkage connected with said float and connected with a pulley about which the flexible element is trained to displace said pulley in response to motion of said float, and said control float is attached to a free end of the flexible element.

4. The combination defined in claim 2, wherein said operating parameter constitutes a liquid level and said sensing means comprises a regulating float, said regulating float is attached to a free end of said flexible element, and said control float is suspended from a pulley engaging a bight formed in an intermediate part of said flexible element.

5. In an hydraulic system including a liquid tank, means supplying liquid into the tank, and a discharge pipe for liquid from the tank, a regulator system comprising a pressure-responsive obturator means variably positionable in relation to the discharge pipe to control the rate of flow therefrom, an auxiliary pressure-fluid circuit means connected with the obturator means and including a valve operable to modify the fluid pressure acting on the obturator means to vary the position thereof in relation to said discharge pipe, means sensing an operating parameter of said system, a control connection from said sensing means to said valve, a follow-up connection from said obturator means to said valve to reposition the valve on variation in the position of the obturator means, means for disabling said control connection to suspend the action of said operating parameter on the valve and maintain the obturator means at a prescribed setting relative to said discharge pipe, including means for progressively re-establishing said control connection to reintroduce said controlling action in a gradual manner, said operating parameter constituting a rate of liquid flow, and said sensing means comprises a differential-pressure flow sensing device a lever connected to operate said valve, linkage connected to said obturator means and to an intermediate point of said lever to provide said follow-up connection, a pair of pressure take-offs connected with said differential-pressure flow-sensing device and connected with opposite end points of said lever to apply torque to said lever to operate the valve, and means connecting said control float to a point of said lever to apply torque thereto for operating the valve in said one direction when the control tank is drained empty of liquid and the control float is resting on the bottom of the tank by gravity.

6. The combination defined in claim 5, further including additional torque-exerting means connected to a point of said lever for modifying the torque applied to the lever by said differential flow-sensing device and said control float.

7. The combination defined in claim 6, including conduit means supplying liquid to said liquid tank, a float sensing the level of liquid in said conduit means, and means connecting said additional torque exerting means to said last level sensing means to modify the torque applied to the lever in response to variations in the level in said supply conduit means.

8. The combination defined in claim 7, wherein said additional torque exerting means comprises an air capacity connected to said point of the lever and movable in response to the air pressure therein to exert said additional torque on said lever, and means are provided for converting motions of said last-mentioned float into variations in air pressure and means for applying said pressure variations into said air capacity to move the latter in response to variations in said supply level.

9. In an hydraulic system including a liquid tank, means supplying liquid into the tank, and a discharge pipe for liquid from the tank, a regulator system comprising a pressure-responsive obturator means variably positionable in relation to the discharge pipe to control the rate of flow therefrom, an auxiliary pressure-fluid circuit means connected with the obturator means and including a valve operable to modify the fluid pressure acting on the obturator means to vary the position thereof in relation to said discharge pipe, means sensing an operating parameter of said system, a control connection from said sensing means to said valve, a follow-up connection from said obturator means to said valve to reposition the valve on variation in the position of the obturator means, means for disabling said control connection to suspend the action of said operating parameter on the valve and maintain the obturator means at a prescribed setting relative to said discharge pipe, including means for progressively re-establishing said control connection to reintroduce said controlling action in a gradual manner, said liquid tank constituting a filter tank, said hydraulic system including a storage reservoir for filtered water underlying said discharge pipe, said operating parameter constituting the level of filtered water in said storage reservoir, and regulator means associated with the means supplying unfiltered water into said filter tank.

References Cited by the Examiner

UNITED STATES PATENTS

| 987,048 | 3/1911 | Connet | 91—384 X |
|---|---|---|---|
| 2,136,693 | 11/1938 | Kniskern | 91—384 X |
| 2,451,029 | 10/1948 | Hughes | 137—414 X |
| 2,867,233 | 1/1959 | Adelson | 91—384 X |
| 2,984,360 | 5/1961 | Smith | 210—104 |
| 3,040,714 | 6/1962 | Taiclet | 91—384 X |

FOREIGN PATENTS 412,653  7/1934  Great Britain.

REUBEN FRIEDMAN, *Primary Examiner.*

D. M. RIESS, *Assistant Examiner.*